US000001275H

United States Statutory Invention Registration [19]

[11] Reg. Number: H1275

Duncan

[43] Published: Jan. 4, 1994

[54] POLYESTER FIBERS

[75] Inventor: Patrick J. Duncan, Wilmington, N.C.

[73] Assignee: E. I. Du Pont de Nemours and Company, Wilmington, Del.

[21] Appl. No.: 768,507

[22] Filed: Sep. 30, 1991

[51] Int. Cl.[5] ..... D02G 3/00

[52] U.S. Cl. ..... 428/357; 428/364; 428/362; 428/369; 264/291; 524/493; 525/446

[58] Field of Search ..... 428/364, 362, 369, 357; 264/291; 524/493; 525/446

[56] References Cited

U.S. PATENT DOCUMENTS

| | | | |
|---|---|---|---|
| 2,744,087 | 5/1956 | Snyder | 260/75 |
| 3,335,211 | 8/1967 | Mead et al. | 264/176 |
| 3,576,773 | 4/1971 | Vaginay | 260/22 |
| 3,816,486 | 6/1974 | Vail | 260/75 |
| 4,039,347 | 1/1987 | Hancock et al. | 428/264 |
| 4,666,454 | 5/1987 | DeMartino et al. | 8/494 |
| 4,704,329 | 11/1987 | Hancock et al. | 428/361 |
| 4,833,032 | 5/1989 | Reese | 428/369 |

*Primary Examiner*—Robert L. Stoll
*Assistant Examiner*—Joseph D. Anthony

[57] ABSTRACT

Polyester filaments of 0.5–2 denier per filament from ethylene terephthalate polymers modified both by polyethylene oxide and by tetraethyl silicate to give polymers of commercial spinning viscosities, and textile fibers and fabrics having greatly improved dye rates, good color stability to standard lightfastness and wash cycles and good pilling, when compared to unmodified polyester and polyester/cotton blend fabrics.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYESTER FIBERS

TECHNICAL FIELD

This invention relates to improved polyester fibers, and more particularly to spinning such fibers from modified polymers that combine polyethylene oxide and tetraethyl silicate additives with poly(ethylene terephthalate) to give commercial quality polyester manufacturing (i.e. spinning) processes and fibers having both significantly enhanced dye rates, that retain surprisingly good color stability to light and wash cycles, and good pilling performance.

BACKGROUND OF INVENTION

Polyester apparel fibers are for the most part produced from a standard homopolymer polyethylene terephthalate base using either dimethyl terephthalate/diethylene glycol or terephthalic acid/diethylene glycol as starting materials. The commercial need to minimize polymer discontinuities during the polymer spinning operation has mostly required that the polymer have a sufficientdegree of polymerization (18 to 24 LRV) to provide a spinnable melt. Polymer viscosities between 800 and 1800 poise have generally been employed, because spinning discontinuities have been more numerous at lower viscosity, even below 1000 poise. Additives such as the branching agents described by Mead and Reese in U.S. Pat. No. 3,335,211 and by Vaginay in U.S. Pat. No. 3,576,773 can be added to the lower chain length materials in order to raise polymer viscosity and allow commercial spinning performance. "By trifunctional or tetrafunctional branching agent" herein is meant trifunctional and tetra functional branching agents of the type disclosed by Mead and Reese and by Vaginay.

Fibers made in the above manners generally have at least one and sometimes two undesirable properties. For instance, fibers produced with high LRV polymer give knit and woven fabrics and garments that form undesirable "pills" from surface abrasion during normal wear and require high energy superatmospheric and/or enviromentally undesirable chemical additives to the dye systems to effect the coloration desired and necessary for commerce. Fibers and fabrics produced from reduced chain length polymers by the incorporation of melt viscosity enhancing additives that may give reduced "pill" fabrics and garments, still require the use of the high energy dye or chemical systems to achieve coloration.

Historically, polymer modifications (e.g. polyethylene oxides, adipates, glutarates, etc.) have been used to enhance the dye rate and styling versatility in carpet and rug fibers of high dpf (typically 6 and above dpf, denier per filament) and allow easy atmospheric dyeing. Dye enhancing polymer modifications have been practically limited to less sensitive non-textile end uses because the modifiers depress polymer viscosity and can lead to excessive spinning discontinuities that render spinning processes non-commercial and fabrics nonsaleable because of excessive defects. The normal route to correcting spinning performance has been to increase the degree of polymerization(LRV). This has had the unwanted effect of increasing fiber strength and subsequently fabric pilling.

SUMMARY OF THE INVENTION

According to one aspect of the present invention, there is provided a novel combination of polymer modifier and tetraethyl silicate (TES) that provides polymers of reduced molecular weight to give surprisingly high, commercial quality, spinning without excessive spinning discontinuities and defects. The resulting spun and drawn fibers provide fabrics with significantly enhanced dye rates, good light and wash dye stability, good pilling characteristics and without fiber defects that are normally associated with polymer modification and poor spinning performance. The polymer modifier is polyethylene oxide (PEO) of molecular weight in the range 200–2000. Spinning viscosity is maintained at greater than 800 poise by adjusting the tetraethyl silicate level in the range 0.05 to 3 mole percent of the final polymer.

Accordingly, there are provided textile fibers of about 0.5 to 2 denier per filament, consisting essentially of poly(ethylene terephthalate) polymer of relative viscosity (LRV) in the range about 9 to 17, modified to provide a Relative Dye Rate (RDR) of at least 150 by containing about 1.5 to about 5% by weight of polyethylene oxide of molecular weight in the range about 200 to about 2000, and modified to provide spinning continuity by having been polymerized with presence of a trifunctional or tetrafunctional viscosity builder in amount about 0.05 to 0.3 mole percent.

This novel combination in a polyester fiber of low dpf, of polymer modification, relative viscosity and tetraethyl silicate to control polymer molecular weight and melt viscosity, provides textile fibers and fabrics that dye faster and with much lower energy than conventional PET. Surprisingly, lightfastness, washfastness and staining properties of the resulting dyed fabrics are excellent. Likewise, the novel combination provides fabrics with good pilling performance.

According to another aspect of this invention, textile fibers of this invention may be made by melt spinning and drawing PET filaments of the correct polymer composition to give the desired dye enhancement and with commercially acceptable spinning vicosity, as shown in the Examples.

The polymer preferably includes a delusterant. Optical brighteners in most cases are advantageous since polymer modifiers tend to cause some discoloration of the polymer. Cross-sections are generally but not limited to round. Fibers are generally cut to staple lengths dependent on the contemplated end use, e.g. 5 to 75 mm. Mixed deniers may be used.

It will be understood that both terms "filament" and "fiber" are used generically herein. While the primary application discussed is staple, it is believed that continuous filament applications in the form of yarn or tow would provide similar dye, and pilling advantages when converted into knit or woven fabrics.

DETAILED DESCRIPTION

The use of tetraethyl silicate in polyester fibers has been described in Mead and Reese U.S. Pat. No. 3,335,211. Mead and Reese do not teach the particular benefits that I have found of tetraethyl silicate with regards to modified polymers that depress polymer melt viscosity. As indicated herein, an essential element of this invention is the selection of a specific combination of polymer modification, polymer viscosity as measured by both LRV and poise, and mole percent tetraethyl silicate that allow commercial quality spinning performance and provide textile fibers of suitably low dpf with significantly enhanced dye rates. Fibers produced in this manner show surprisingly good combinations of properties, including good pilling performance, and both good dye lightfastness and washfastness stability.

Polyethylene terephthalate containing polyethylene glycol has already been disclosed in the art, e.g. by Snyder in U.S. Pat. No. 2,744,087 and by DeMartino in U.S. Pat. No. 4,666,454, the disclosures of which are hereby incorporated herein by reference. Similarly, the disclosures of Vail U.S. Pat. No. 3,816,486, and Hancock et.al. U.S. Pat. No. 4,704,329 are hereby incorporated herein by reference to disclose the various processing techniques for preparing drawn annealed and drawn relaxed fibers, and various polymers, compositions and cross-sections of filaments that may be produced according to invention.

The addition of PEO is used to increase the dyeability and the commercial value of the fiber. A molecular weight of 600 was used because it was convenient, but may vary from about 200 to about 2000.

As indicated above, each of the elements of the present invention, namely, the selected polyethylene terephthalate polymer, PEO modifier, tetraethyl silicate melt viscosity enhancer and the apparel deniers have been used separately for various textile applications but have not, so far as I know, been used in the present combination for this purpose.

The invention is further illustrated in the following Examples. The PEO was of molecular weight 600. The T107 and T40A fibers used for comparative purposes were prior art "pill resistant" fibers that are presently commercially available from Du Pont, and are of homopolymer PET, without PEO. The relative viscosity of the polymer was measured essentially as described in Hancock et. al. U.S. Pat. No. 4,704,329, col. 9, lines 6–11, but on a solution obtained by dissolving 0.40 grams of fiber in 5.0 ml of solvent. The relative dye rate (RDR) was measured by subjecting the samples and referenced control samples to common dye conditions, in an agitated, temperature controlled dye apparatus using normal Merpol and Avitone surfactants at 1.0 g/L each, a 4.15 pH buffer to control solution acidity and Blue GLF dye at 0.037 g/g of fiber. No carrier was employed. After a 1 deg C per minute rise from 60C the fibers were dyed for 40 min at 95C. Pads were rinsed and measured for Reflectance on a Hunter Model D25D2M Colorimeter. Reflectances were converted to K/S values for each specimen via the equation:

$$K/S=(1-(R/100))\wedge 2/(2R/100)$$

and the Relative Dye Rate (RDR) was calculated by the equation:

$$RDR=(K/S\ test)/(K/S\ control)\times 100$$

Colorfastness to light was measured on dyed knit fabric by subjecting the specimens to Xenon-Arc light as prescribed in AATCC Test Method 16E-1982. The samples after being subjected to the light source for 40 hours were evaluated for color loss by reference to the Gray Scale for Color Change. Washfastness and Staining were determined on a different portion of the same dyed fabric by procedures described in AATCC Test Method 61-1985 and specifically in the IIA Test for commercial and home launderings. As with the Lightfastness Test, the Washfastness specimens were graded with reference to the Gray Scale for Color Change. On this scale a grade of 5 indicates negligible or no change. A grade of 4 indicates a color change equivalent to Gray Scale Step 4, a grade of 3 indicates equivalence to a Gray Scale Step 3, and so forth; the severity of the change being greatest at Gray Scale Step 1. Staining was assessed by rating the transfer of dye to a #10 multifiber fabric composed of Dacron®, nylon, Orlon®, Wool and acetate. The multifiber fabrics were pinned to the sample specimens during the IIA Wast Test. The staining was rated in a manner similar to that used for Lightfastness and Washfastness, but against the AATCC Chromatic Transference Scale. Again, the grades ranged from 5 to 1 with a 5 grade indicating no or negligible staining.

EXAMPLES

Example 1

A series of fiber items were produced with conventional unmodified PET (Item #1) and modified PET (Items #2 and #3) according to the invention. All were delustered with 0.10 weight percent Ti02. Item #2 was modified with 2% PEO, and Item #3 with 4.3 weight % PEO. All fibers used a specified combination of tetraethyl silicate and LRV to provide polymer with sufficient viscosity for good spinning.The polymers were melt spun at 282°–283° C. and 80 pounds per hour through a spinneret with 900 round capillaries. The spinning unit was fitted with polymer rheological equipment and polymer melt viscosity was measured for each item. The filaments were collected at 1800 yards per minute on bobbins using a commercial winding device. Bobbins of each item were combined in a creel and drawn on a test apparatus having (A) the capability of drawing in 1 or 2 stages in saturated liquid sprays, crimping and hot air relaxing, or (B) the capability of drawing in 1 or 2 stages in saturated liquid sprays and annealing in saturated steam as described in U.S. Pat. No. 4,639,347, crimping and hot air drying. The fibers were tested for tensile properties, relative dye rate and flex life properties. Flex life is an indicator of fabric pilling. The results are shown in Table 1.

TABLE 1

| | Item Number | | | | | |
|---|---|---|---|---|---|---|
| | 1 CONTROL | | 2 INVENTION | | 3 INVENTION | |
| Polymer LRV | 11.2 | | 12.2 | | 14.6 | |
| PEO 600, wt. % | None | | 2 | | 4.3 | |
| Polymer Viscosity | 1080 | | 963 | | 871 | |
| Mole % TES | 0.21 | | 0.21 | | 0.21 | |
| Draw Process | 1A Relax | 1B Anneal | 2A Relax | 2B Anneal | 3A Relax | 3B Anneal |
| Total Draw Ratio | 3.13 | 3.07 | 3.17 | 3.48 | 3.17 | 3.53 |
| Anneal psig | — | 150 | — | 150 | — | 150 |

TABLE 1-continued

| | Item Number | | | | | |
|---|---|---|---|---|---|---|
| | 1 CONTROL | | 2 INVENTION | | 3 INVENTION | |
| Dryer Temp C. | 120 | 75 | 120 | 76 | 120 | 75 |
| Denier/Filament | 1.33 | 1.28 | 1.33 | 1.14 | 1.34 | 1.16 |
| Tenacity | 3.7 | 4.0 | 3.7 | 4.7 | 3.6 | 3.7 |
| Elongation % | 34 | 22 | 40 | 14 | 44 | 19 |
| Relative Dye Rate | 104 | 123 | 156 | 189 | 290 | 416 |
| Flex Life | 789 | 604 | 763 | 1079 | 1010 | 1452 |

TABLE 2

| | CONTROLS | | INVENTION | | | | PRIOR ART | |
|---|---|---|---|---|---|---|---|---|
| Item Number | 1A | 1B | 2A | 2B | 3A | 3B | T-40A | T-107 |
| Modified Polymer | No | No | Yes | Yes | Yes | Yes | No | No |
| Polymer LRV | 11.2 | 11.2 | 12.2 | 12.2 | 14.6 | 14.6 | 14.0 | 11.5 |
| PEO, wt. % | 0.0 | 0.0 | 2.0 | 2.0 | 4.3 | 4.3 | 0.0 | 0.0 |
| Mole % TES | 0.21 | 0.21 | 0.21 | 0.21 | 0.21 | 0.21 | 0.10 | 0.16 |
| Pill Rating | | | | | | | | |
| @ 15 min. | 3.0 | — | 3.5 | 3.8 | 3.8 | 3.2 | 3.5 | 3.3 |
| @ 30 min. | 1.5 | — | 1.5 | 1.3 | 2.3 | 1.5 | 1.5 | 1.8 |
| @ 60 min. | 1.5 | — | 1.7 | 1.0 | 1.3 | 1.2 | 1.2 | 1.3 |
| Lightfastness | — | — | 4-3 | — | — | 4-3 | — | 3-2 |
| Washfastness | — | — | 4 | — | — | 5 | — | 5-4 |
| Staining | — | — | 3 | — | — | 4-3 | — | 3-2 |

Example 2

The items in Table 1 were cut to 1½" fiber length and blended with 50% combed cotton and processed on commercial textile machinery, ring spun to 28/1 cc yarns, and knit into 22 cut jersey fabrics on a commercial machine. At the same time and on the same equipment, yarn samples from commercially available "pill resistant" 1.5-T107 and 1.2-T40A fibers were prepared. The knit fabrics were atmospherically dyed and subjected to the standard Random Tumble Pill Test, essentially as described in ASTM D3512, with ratings at the intervals indicated herein. The Flex Life data in Table 1 predicts and RTPT data in Table 2 demonstrates pill performance comparable to the current commercially available pill resistant fibers.

Some of the fabrics were also subjected to standard Lightfastness, Washfastness and Staining tests. For this procedure the fabrics were prescoured, dyed without any carrier in an Ahiba dye apparatus at 212F for 60 minutes with 0.50% Intrasil Red FTS dyestuff, and post scoured. The samples were then evaluated for Lightfastness, Washfastness and Staining by the AATCC Methods referenced above. The data of Table 2 demonstrates dye stability properties comparable to commercially acceptable fabrics. This is very surprising in view of the extensive polymer modification by the PEO (and tetraethyl silicate).

Example 3

The invention was further demonstrated for a range of 1.0 to 1.5 dpf textile products on commercial equipment. Similarly to Example 1, polymer was modified with 2.0 to 2.2 weight percent 600 MW PEO, and polymerized to 15.9 LRV in the presence of 0.11 mole % tetraethyl silicate additive. Polymer viscosity was measured for each item by the use of suitable rheology equipment and is given in Table 3. Spinning performance of all items was commercially acceptable. Indeed, spinning interruptions were very few, and were comparable to those experienced during spinning of control fibers from polymer without any PEO, as can be seen from Table 3. Spun supplies of between 840 and 953 spinning ends were 2 stage draw and annealed per the teaching of U.S. Pat. No. 4,639,347, crimped and dried to give fibers with enhanced dye rate properties, as compared with control fibers prepared from polymer without any PEO, as shown in Table 3.

TABLE 3

| ITEM | 4 | 5 | 6 | RELAXED CONTROL | ANNEALED CONTROL |
|---|---|---|---|---|---|
| Polymer LRV | 15.9 | 15.9 | 15.9 | 11.4 | 14.0 |
| Weight Percent PEO | 2.0 | 2.2 | 2.2 | None | None |
| Mole Percent TES | 0.11 | 0.11 | 0.11 | 0.16 | 0.10 |
| Polymer Temperature, C. | 281 | 281 | 281 | 279 | 280 |
| Polymer Viscosity, Poise | 1040 | 1020 | 1012 | 842 | 1089 |
| Spinning Interruptions, per 1000 pounds | 0.15 | 0.06 | 0.00 | 0.04 | 0.14 |
| Deniser per Filament | 1.12 | 1.27 | 1.44 | 1.50 | 1.17 |
| Tenacity | 5.1 | 5.3 | 5.1 | 3.8 | 4.8 |
| Elongation % | 23.1 | 22.5 | 22.6 | 33.2 | 22.5 |
| Dry Heat Shrinkage | 5.1 | 5.3 | 8.5 | 6.5 | 5.5 |
| RDR vs Anealed Control | 2.11X | 2.19X | 2.15X | 0.92X | — |

Example 4

One and one-half inch cut fibers from items 5 and 6 of Table 3 and from commercially available "pill resistant" 1.5-T107 and 1.2-T40A were each draw blended to a 50/50 ratio with combed cotton, processed on commercial textile equipment, and then ring spun to 1 cc yarns on commercial textile equipment. The yarns of each item were knit to 22 cut jersey fabric on a commercial knitting machine, dyed and subjected to the Random Tumble Pill Test. The test indicates pill performance comparable to these commercially available "pill resistant" fibers.

| Item | 5 | 6 | T107 | T40A |
|---|---|---|---|---|
| Pill Rating (of fabrics of yarns of 50/50 blends with cotton) | | | | |
| @ 15 min. | 3.8 | 3.0 | 3.8 | 3.5 |
| @ 30 min. | 2.2 | 2.5 | 2.7 | 2.2 |
| @ 60 min. | 1.7 | 2.0 | 2.0 | 1.5 |

I claim:

1. Textile fibers of about 0.5 to 2 denier per filament, consisting essentially of poly(ethylene terephthalate) polymer of relative viscosity (LRV) in the range about 9 to 17, modified to provide a Relative Dye Rate (RDR) of at least 150 by containing about 1.5 to about 5% by weight of polyethylene oxide of molecular weight in the range about 200 to about 2000, and modified to provide spinning continuity by having been polymerized in the presence tetraethyl silicate in amount about 0.05 to 0.3 mole percent.

2. Textile fibers according to claim 1 that are of round cross-section and that are optically whitened with 0.1 to 0.4 weight percent titanium dioxide.

3. Textile fibers according to claim 1 or 2, characterized in that they have been crimped and then relaxed at a temperature in the range of about 110°–155° C.

4. Textile fibers according to claim 1 or 2, characterized in that they have been annealed at a temperature in the range of about 150°–230° C. and have been crimped and relaxed at a temperature in the range of about 60°–100° C.

5. Textile fibers according to claim 1 or 2 that are of deliberately mixed denier.

6. Textile fibers according to claim 1 or 2, that are staple fibers of cut length about 5 to 75 mm.

* * * * *